Patented May 22, 1934

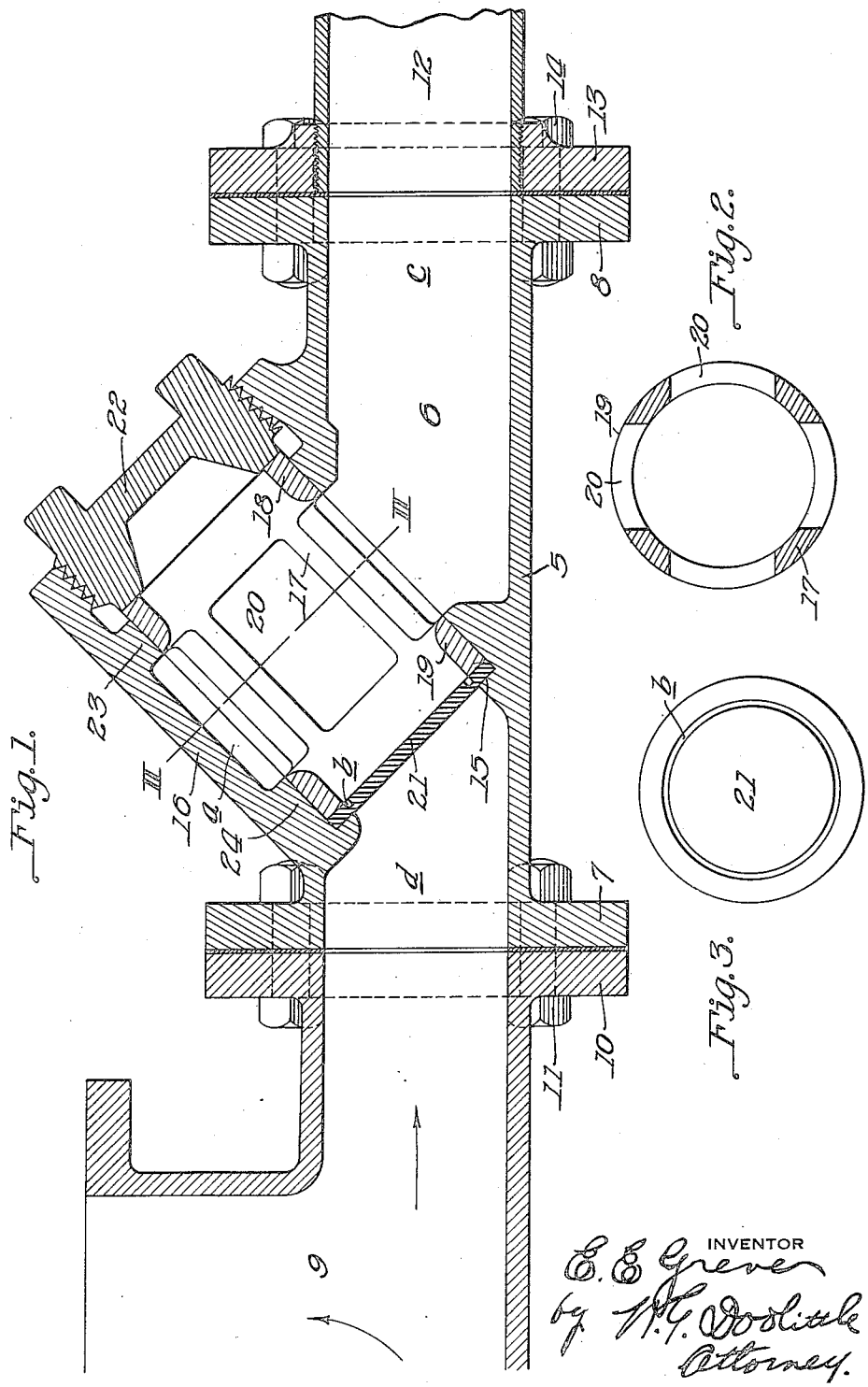

1,959,822

UNITED STATES PATENT OFFICE 1,959,822

RELIEF DEVICE

Edgar E. Greve, Bellevue, Pa., assignor, by mesne assignments, to Oil Well Supply Company, Pittsburgh, Pa., a corporation of New Jersey Application January 4, 1929, Serial No. 330,303

5 Claims. (Cl. 220—89)

My invention relates to improvements in relief devices and more particularly to that class of relief devices especially designed for use in the oil fields.

Pumps and pipes for handling the slush or mud fluid employed in connection with rotary drilling processes are sometimes injured by being subjected to excessive pressure. Valves such as have heretofore been employed for this purpose have been the source of considerable trouble, due primarily to the cutting away of the valves, valve seats and other parts of the valve structure, due to the presence of sand and other gritty substances in the slush.

The prime object of the present invention is to provide a relief device of the character stated free of moving parts and of such construction that it will not be rendered inoperative due to the cutting action of the materials handled.

In the accompanying drawing which illustrates an application of my invention:

Fig. 1 is a longitudinal sectional view of a relief device embodying my invention applied to a discharge line extending from a pump;

Fig. 2, a sectional view of the follower taken on line II—II of Fig. 1; and,

Fig. 3, a plan view of the destructible disk member employed in the relief device.

Referring to the drawing, 5 designates a Y member forming the body of a device embodying my invention, said body being formed with a central longitudinally extending bore 6 and with annular outwardly projecting flanges or collars 7 and 8, the latter providing means for securing the device to pipes or other apparatus.

As shown, the device is applied to a discharge line leading from a pump. In this line 9 designates a T-fitting having a flanged portion 10 to which the device is secured by bolts 11. At the opposite end, the device is connected up with a pipe 12 having a threaded end entered into an annular flange 13. Bolts 14 connect the said flange 13 to the flange 8 of the device.

The interior of the body 5 is provided at the crotch of the Y with a seat 15 constituting a portion of an annular wall 16 disposed at an angle with the longitudinal axis of the body 5. This annular wall 16 forms a chamber $a$ to receive a ported separator or follower 17 adapted to be removably disposed therein. This follower or separator 17, comprising as it does upper and lower ring portions 18 and 19, and the ports 20, is a reversible element, in that it may be disposed within the chamber with either end located adjacent the seat 15.

A characteristic and important feature of the present invention resides in the employment of a destructible relief member such as the disc 21 designed to be normally held in position on the seat 15 by the follower or separator 17. This disk 21 is preferably formed of lead or other suitable material of such a character that it will be ruptured when a predetermined pressure is applied thereto.

Said disk 21 may be provided with an annular groove $b$ which will permit the center portion of the disk to shear or break in such a manner as to provide a full opening for the escape of fluid through the outlet port $c$ of the relief device when the pressure in the inlet port $d$ of the structure overcomes the resistance of the said disk 21.

22 designates a threaded plug or closure member for the chamber $a$; said member being adapted to bear upon the upper end of the separator or follower 17 thereby holding the same downwardly against the periphery of the disk 21. It will be noted that the annular wall 16 forming the receiving chamber $a$ is provided with an inwardly projecting annular guide portion 23 and with an enlarged or thickened wall portion 24; said portions 23 and 24 will act as guides for the removable separator or follower member 17.

It will be understood that during normal operation the disk 21 will prevent the passage of fluid from the pump through the relief structure, but upon an increase of the pressure to such a degree as would affect the proper working of the pump, the disk will be ruptured, thereby permitting the escape of fluid through the outlet end of the relief device to the pipe 12 from whence it is passed to any desired point.

After the destruction of the disk 21 in the manner stated, the pump is shut down and, in order to again operate, a new disk must be inserted. The removal of what remains of the old disk and the insertion of a new disk may be readily effected without disturbing any connections in the line in which the relief device is employed, by a removal of the closure member 22 and the follower 17.

What I claim is:—

1. In a relief device of the character described, a hollow body having inlet and outlet ports and an open ended chamber disposed at an angle to said ports, a seat in said chamber, a destructible disk positioned on the seat to close communication between the inlet and outlet ports and means held at one end near the open end of said chamber and spanning said chamber, the other end of said means bearing on said disc at the peripheral margin thereof to hold said disk on its seat, said disk being insertable and removable through the open end of said chamber.

2. In a relief device of the character described, a hollow body having inlet and outlet ports, a seat on the interior of the body, a destructible disk positioned on the seat for closing communication between the inlet and outlet ports, and means for normally maintaining the disk on its seat, said means comprising an annular ported member disposed in the body and a detachable plug cooperating with the member.

3. In a relief device of the character described, a hollow body formed with inlet and outlet ports and a chamber disposed at an angle to said ports, a seat in the body between the inlet and outlet ports, a destructible disk disposed on said seat, a ported member in said chamber for normally maintaining the disk on its seat, and a detachable closure member for the chamber said ported member being held against said disk by said closure member.

4. In a relief device of the character described, a hollow body having inlet and outlet ports and means at opposite ends for connections with a discharge line, an open-ended chamber disposed at an angle to said ports, a destructible disk in the chamber for closing communication between the inlet and outlet ports, a removable closure plug for the chamber, said disk being insertable in and removable from the chamber through its open end without breaking the connections in the discharge line and means secured in position by said closure plug to hold said disk in position in said chamber.

5. In a relief device of the character described, a hollow body having a passageway between inlet and outlet ports, a seat in the body between said ports, a destructible member positioned on the seat to close communication between the inlet and outlet ports, said body having a branch passageway through which said destructible member is insertable and removable, a closure for said branch passageway and means held in position by said closure member for normally maintaining said destructible member, when inserted, on said seat.

EDGAR E. GREVE.